US00RE44006E

(19) United States
(12) Reissued Patent
Cherian et al.

(10) Patent Number: US RE44,006 E
(45) Date of Reissued Patent: Feb. 19, 2013

(54) USER INTERFACE FOR TELEVISION

(75) Inventors: Lisa Cherian, Briarcliff, NY (US); Robert Andrew Lambourne, Eindhoven (NL); Guy James Roberts, Eindhoven (NL)

(73) Assignee: Koninklijke Philips Electronics N.V., Eindhoven (NL)

(21) Appl. No.: 12/605,738

(22) Filed: Oct. 26, 2009

Related U.S. Patent Documents

Reissue of:
(64) Patent No.: 6,211,921
Issued: Apr. 3, 2001
Appl. No.: 08/772,080
Filed: Dec. 20, 1996

(51) Int. Cl.
*H04N 5/445* (2006.01)

(52) U.S. Cl. ..... 348/565; 348/564; 348/E5.103; 386/E5.07; 715/856

(58) Field of Classification Search ..... None
See application file for complete search history.

(56) References Cited

U.S. PATENT DOCUMENTS

| | | | | |
|---|---|---|---|---|
| 5,218,672 | A | 6/1993 | Morgan et al. | |
| 5,270,689 | A | 12/1993 | Hermann | |
| 5,353,121 | A * | 10/1994 | Young et al. | 725/52 |
| 5,484,197 | A | 1/1996 | Hoarty | |
| 5,485,197 | A * | 1/1996 | Hoarty | 348/7 |
| 5,500,794 | A | 3/1996 | Fujita et al. | |
| 5,508,736 | A | 4/1996 | Cooper | |
| 5,528,304 | A | 6/1996 | Cherrick et al. | |
| 5,543,857 | A | 8/1996 | Wehmeyer et al. | |
| 5,604,544 | A | 2/1997 | Bertram | |
| 5,616,031 | A | 4/1997 | Logg | |
| 5,627,531 | A | 5/1997 | Posso et al. | |
| 5,648,813 | A * | 7/1997 | Tanigawa et al. | 725/139 |
| 5,687,331 | A | 11/1997 | Volk et al. | |
| 5,995,106 | A | 11/1999 | Naughton et al. | |
| 6,160,551 | A | 12/2000 | Naughton et al. | |

FOREIGN PATENT DOCUMENTS

| | | |
|---|---|---|
| EP | 0498082 A1 | 8/1992 |
| EP | 0626635 A2 | 11/1994 |
| EP | 0626635 A3 | 2/1997 |
| EP | 0626635 B1 | 5/2003 |
| JP | 7044477 A | 2/1995 |
| JP | 7098640 A | 4/1995 |
| WO | WO 9428479 | 12/1994 |
| WO | 9501058 A1 | 1/1995 |
| WO | WO 9500597 | 1/1995 |

OTHER PUBLICATIONS

Philip Elmer-Dewitt, "Ready for Prime Time?" Time Magazine, vol. 144, No. 26, December 26, 1994, pp. 74-75.

"Household Information Devices Compete, Part I: Rivals of Personal Computers, Anything Other Than Wintel Selected Becasue of the Cost", Nikkei Byte, vol. 142, Published by Nikkei Business Publication, Inc., September 1995, pp. 134-154.

D. Hopkins, "Directional Selection is Easy as Pie Menus!", USENIX Association, Fourth Computer Graphics Workshop, Cambridge, MA, Oct. 6-9 1987, p. 103.

J. Callahan et al, "*An Empirical Comparison of Pie* vs. *Linear Menus*", Sep. 1987, pp. 1-14.

Screen dump of FSN screen.

* cited by examiner

*Primary Examiner* — Nhon Diep

(57) ABSTRACT

A user interface for a screen oriented electronic device includes a rotating menu of options. Options are highlighted and therefore selectable as they rotate past a fixed position on the screen. A remote is shown for use with the menu.

22 Claims, 5 Drawing Sheets

USER INTERFACE FOR TELEVISION

Matter enclosed in heavy brackets [ ] appears in the original patent but forms no part of this reissue specification; matter printed in italics indicates the additions made by reissue.

I. BACKGROUND OF THE INVENTION

A. Field of the Invention

The invention relates to the field of user interfaces for an electronic device having a screen.

B. Related Art

Time Warner Corporation field tested a prototype system called FSN, documented in "Technology Ready for Prime Time", TIME (Domestic), 12/26/94, vol. 144, #26 and on the worldwide web at http://pathfinder.com/@@6J510gcAT1QAg1yH/Corp/divisions/fsn/0O. This system featured a rotating menu with buttons that moved past the cursor.

II. SUMMARY OF THE INVENTION

The object of the invention is to create an improved user interface.

This object is achieved with a rotating menu. The menu has a perspective which allows a highlighted option to appear to be in front. Some of the options rotate off the screen so that a variable number can be added.

In a further embodiment a display of the actual status of a hightlighted device is displayed on the user interface.

III. BRIEF DESCRIPTION OF THE DRAWING

The invention will now be described by way of non-limitative example with reference to the following drawings.

IV. DETAILED DESCRIPTION OF THE PREFERRED EMBODIMENTS

Figure 1:
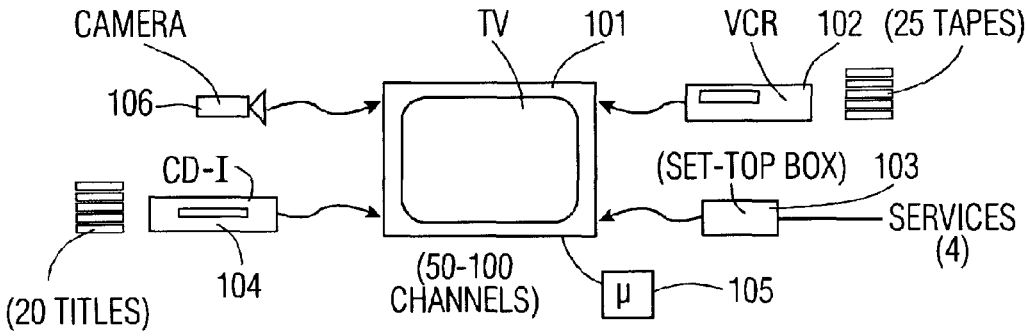
FIG. 1 shows a system in which the invention can be used.

FIG. 1 shows a home entertainment system in which the invention can be used. The system includes a TV 101, a VCR 102, a set top box 103, a CD-I player 104, and a camera 106. Any of these items is optional, except that some device with a screen, such as a TV or PC, is needed to display the menu of the invention. Other items might also be included depending on what kind of home entertainment devices are desired. A controller 105 for the display is also needed. This controller might be a separate device such as a processor or it might be part of one of the devices, such as the television. The menu of the invention might be created using software on a processor or using hardware, such as an ASIC.

Figure 2:
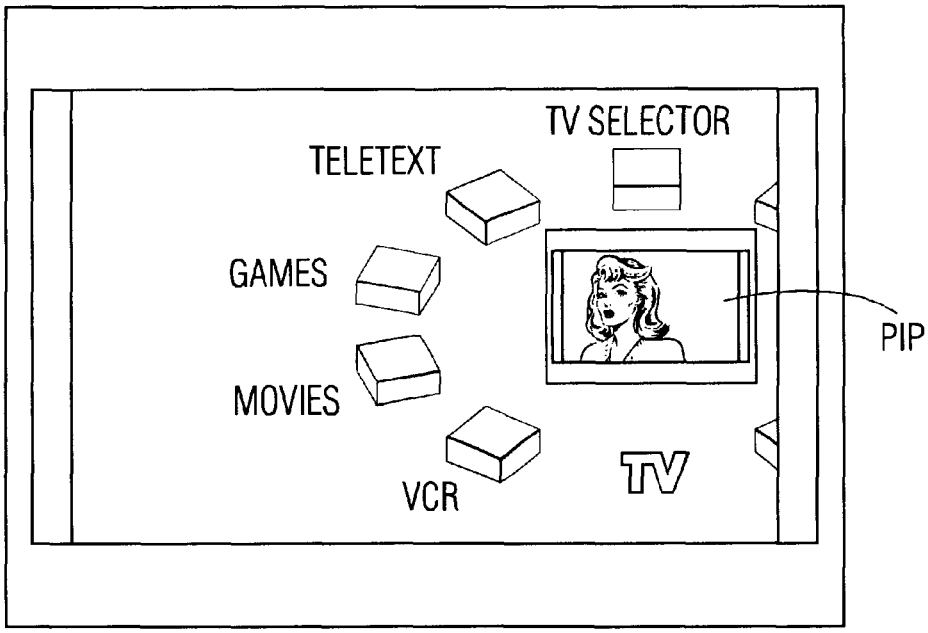
FIG. 2 shows television screen displaying a menu according to the invention.

FIG. 2 shows a television screen displaying a menu according to the invention. The menu is a sort of carousel which rotates on the screen. The menu is displayed in a perspective which creates an apparent plane of rotation of the menu. The apparent plane of rotation is not parallel to the face of the screen. Because of the apparent plane of rotation, a highlighted option appears to be in front. This makes the highlighted option easier to find. Also, the perspective makes the menu options closer together than they would be on the FSN system, so that the user does not need to scan as much of the screen for options. While the menu is actually elliptical, the menu appears to be in a circle, because of the perspective. Additionally, a perspective which allows the user to look "down" on the menu, gives the user a sense of control.

In order to maintain perspective, the appearance of the menu options needs to change during rotation of the menu. For instance, the boxes of the menu of FIG. 2 change in size, shape, and apparent orientation during rotation. These changes include the closer boxes looking larger and the boxes on the sides seeming to turn about the center.

Figure 5:
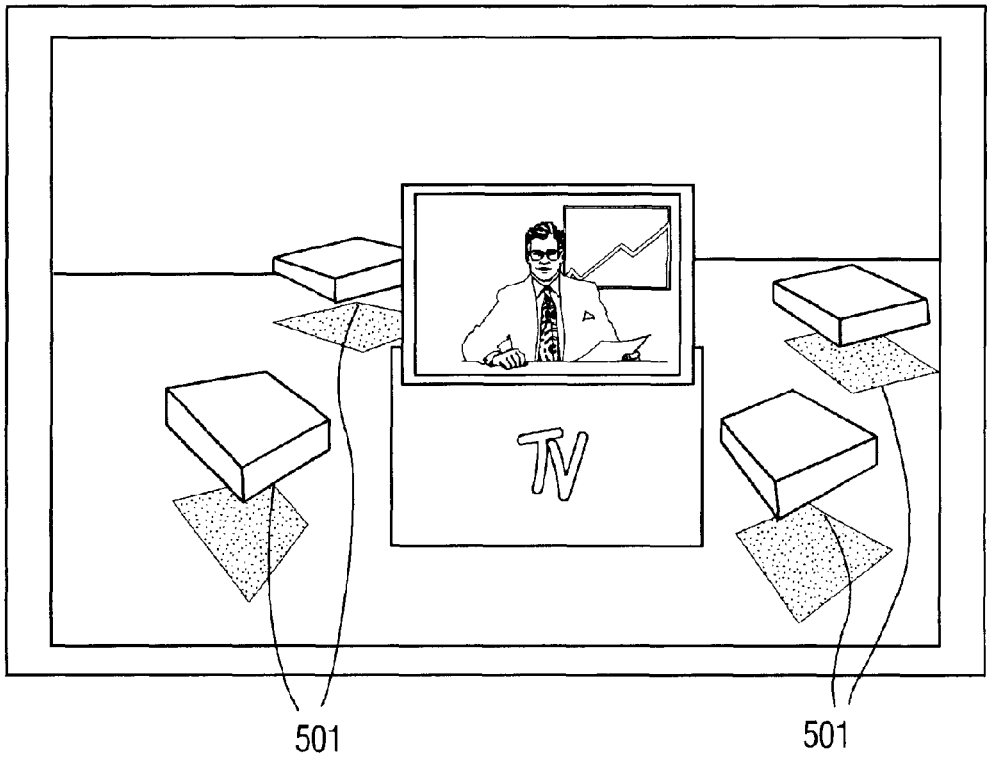
FIG. 5 shows a rotating perspective menu with shadows.

The sense of perspective can be heightened by depicting shadows 501 under the boxes, as shown in FIG. 5.

Preferably, the center of the apparent circle is off center on the screen, so that at least one menu option can be rotated off the screen. Because at least one menu option is rotated off the screen, any number of menu options can be added to the menu without affecting the shape of the display. This facilitates adding additional items to the menu or the system without complicating the display.

At the center of the display, is a picture in picture (PIP) feature. When a particular option is highlighted, a status indication for that option can be displayed in the PIP. The status indication can take the form of a preview. For instance, if the VCR is highlighted, the PIP can display what the VCR is playing or recording. Alternatively, the PIP might contain some text summary of the status of or a menu for the highlighted device.

The menu options can be displayed in any fashion desired. They can, for instance, be boxes, as shown, or icons, or letters.

During operation of the menu, the options rotate, with a selectable option appearing highlighted at the bottom front, as the TV option is shown highlighted in FIG. 2.

Once an option is selected, the screen turns to displaying information regarding control of the device corresponding to that option. For instance, the screen might display a further rotating menu for controlling the selected device. Alternatively, the screen might display some other menu relating to the selected device. Still another alternative might be that the user would have to pick up a remote relating to that other device.

A menu of the sort shown can be created using standard software tools such as Stratavision 3D or Macromedia Director. Such software packages allow entry of three dimensional models. Animation can be created by asking the software for sequential views, which can be put together in sequence. Highlighting can be created by changing color of the menu options on the screen.

Figure 4:
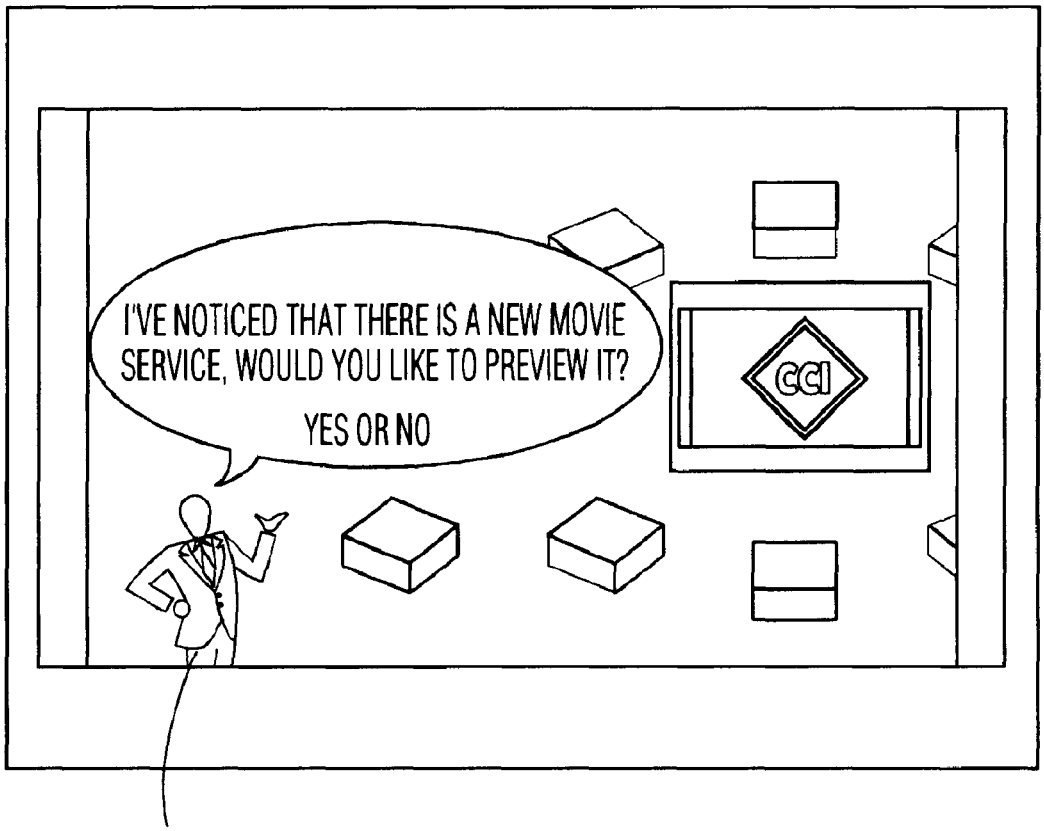
FIG. 4 shows a television screen showing an agent.

FIG. 4 shows an additional optional feature of the menu. This feature is display of an agent 401. Agents are known software devices which carry out some request of the user. For instance, the agent might search the internet, via the set top box, for items of interest to the user. In the illustrated case, the agent has found a movie service that it thinks the user might want to watch and is asking the user whether s/he wants to preview that service. If the user answers yes, the agent will take control of the system and create the desired result.

In this display, the agent is humanoid and asking a question which can be answered yes or no. One of ordinary skill in the art might display the agent in any convenient way.

Figure 3:
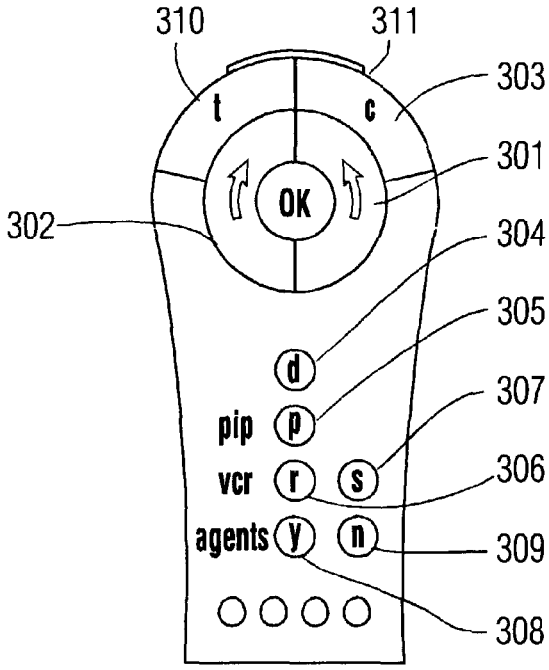
FIG. 3 shows a remote for controlling the menu.

FIG. 3 shows a remote for use with the invention. The remote includes buttons for controlling the rotating menu, along with other items of the system. The buttons for controlling the rotating menu include a first button 301 for rotating the options in a first direction and a second button 302 for rotating the options in a second direction. Arrows on the buttons indicate the direction of rotation. The left button 302 indicates clockwise rotation while the right button 301 indicates counterclockwise rotation.

The buttons 301 and 302 form a curve. Inside the curve is a third button 303 for selecting a currently highlighted menu item. The other buttons appearing on the remote are optional. One of ordinary skill in the art might determine any convenient arrangement of buttons. Those chosen in FIG. 3 are listed in the following table:

TABLE

| Reference Numeral | Button function |
|---|---|
| 304 | disconnects a current service |
| 305 | turns on picture in picture display |
| 306 | turns on the record function of the VCR |
| 307 | stops the VCR |
| 308 | answers "yes" to the question of the agent |
| 309 | answers "no" to the question of the agent |
| 310 | requests tools, such as a help function or other information service |
| 311 | returns to the main menu, e.g. FIG. 2 |

Figure 6:
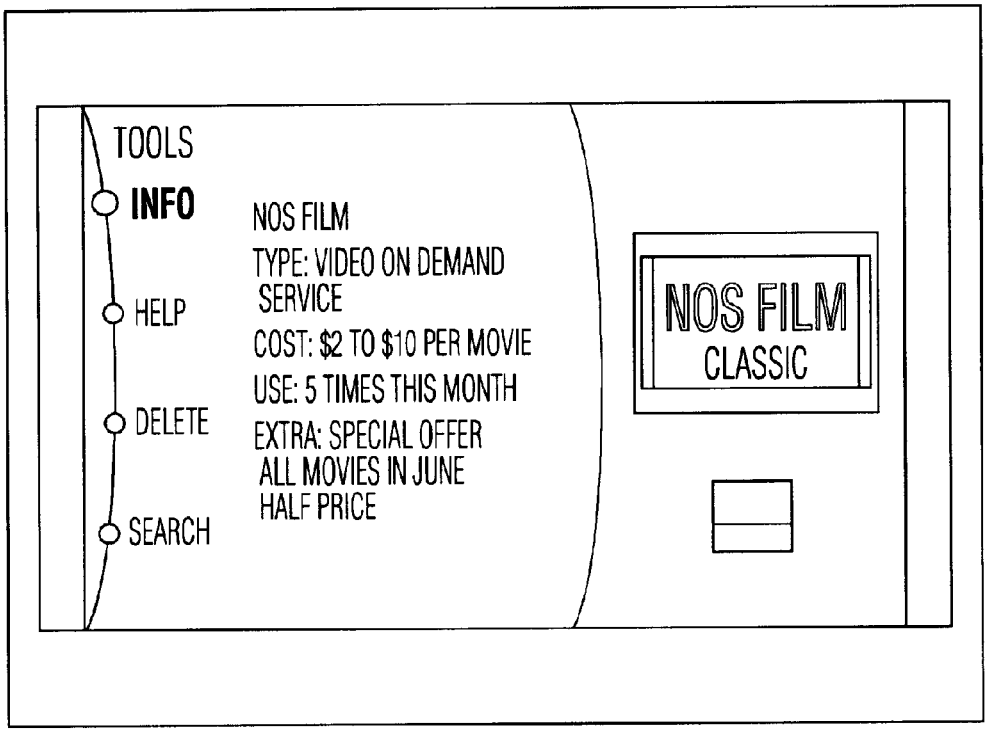
FIG. 6 shows a tool menu.

FIG. 6 shows an example of what might be displayed if button 310 were pressed. One of ordinary skill in the art might devise any convenient or pleasant looking tool menu, according to what is appropriate for the particular application.

In general eliminating buttons on a remote tends to make that remote easier to use. Accordingly, it may be preferable to have most options selectable with a menu and only essential buttons on the remote. Those of ordinary skill in the art will design the remote with those buttons that are best for particular applications.

While the preferred embodiment here relates to controlling a television, the concepts shown here might relate to a menu on any device with a display.

From reading the present disclosure, other modifications will be apparent to persons skilled in the art. Such modifications may involve other features which are already known in the design, manufacture and use of screen devices and remotes and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalization thereof, whether or not it mitigates any or all of the same technical problems as does the present invention. The applicants hereby give notice that new claims may be formulated to such features during the prosecution of the present application or any further application derived therefrom.

We claim:

1. An electronic device comprising:

at least one display apparatus; and a controller arranged to cause the display *apparatus* to show a rotating *elliptical* menu comprising a plurality of menu options, *wherein the menu is displayed with a perspective in which* all of the menu options that are displayed [being displayed so as to] appear to lie substantially [upon] *in an elliptical arrangement located on* a single apparent plane disposed about a menu center, the menu center being displayed offset from a display center of the display apparatus, so that at least one menu option appears to be rotatable off an edge of the display *apparatus* at any one time*; and,*

*wherein a sense of perspective is maintained by changing the shape or size of the displayed menu options during rotation of the menu.*

2. The electronic device of claim 1 wherein the device is a television and the menu options relate to control of the television and devices connected to the television.

3. An electronic device comprising:

at least one display; and a controller arranged to cause the display to show a rotating menu comprising a plurality of menu options, wherein the menu is displayed with a perspective in which all of the options of the menu that are displayed appear to lie coplanar upon a single apparent plane that intersects the display to form an acute angle between the display and the apparent plane*; and,*

*wherein a sense of perspective is maintained by changing the shape or size of the displayed menu options during rotation of the menu.*

4. The device of claim 3 wherein a highlighted menu option appears in a portion of the apparent plane which appears to be closest to a user.

5. The electronic device of claim 3 wherein the menu comprises a selection position and one of the menu options is selectable when that option rotates to the selection position.

6. The electronic device of claim 3 wherein the menu comprises a region where a status indication for a selectable device is displayed.

7. The electronic device of claim 6 wherein menu options are disposed along an apparent curve and the region is disposed within the curve.

8. [The electronic device of claim 6 wherein the region is a picture in picture] *An electronic device comprising:*

*at least one display;*

*a controller arranged to cause the display to show a rotating menu comprising a plurality of menu options, wherein the menu is displayed with a perspective in which all of the options of the menu that are displayed appear to lie coplanar upon a single apparent plane that intersects the display to form an acute angle between the display and the apparent plane; and,*

*wherein the menu comprises a picture in picture region where a status indication for a selectable device is displayed.*

9. The electronic device of claim 8 wherein the device is a television;

the menu options include control of a VCR connected to the television; and the picture in picture displays a tape being played on the VCR.

10. The electronic device of claim 8 wherein the device is a television;

the menu options include control of a VCR connected to the television; and the picture in picture displays a broadcast being recorded on the VCR.

11. The electronic device of claim 3 wherein the device is a television and the menu options relate to control of the television and devices connected to the television.

12. The electronic device of claim 3 further comprising a remote for controlling selection amongst the menu options.

13. The electronic device of claim 12 wherein the remote includes a button for causing rotation of the menu in a direction.

14. The electronic device of claim 13 wherein the button is for causing rotation of the menu by one option per push.

15. The electronic device of claim 13 wherein the remote further comprises a second button for causing rotation of the menu in a second direction opposite to the direction.

16. The electronic device of claim 13 wherein the remote further comprises a selection button for selecting a currently highlighted menu option.

17. [The electronic device of claim 12] *An electronic device comprising:*

*at least one display;*

*a controller arranged to cause the display to show a rotating menu comprising a plurality of menu options, wherein the menu is displayed with a perspective in which all of the options of the menu that are displayed appear to lie coplanar upon a single apparent plane that intersects the display to form an acute angle between the display and the apparent plane; and,*

*a remote for controlling selection amongst the menu options,* wherein the remote comprises first and second buttons for causing rotation of the menu in first and second directions, respectively, which first and second buttons are curved in shape; and a third button for selecting a currently highlighted menu option, which third button is located inside a curve defined by the first and second buttons.

18. The electronic device of claim 12 comprising at least one button for responding to an agent appearing on the screen.

19. The electronic device of claim 3 wherein the display also displays an agent for suggesting options to a user.

20. The electronic device of claim 19 wherein the agent is displayed as a humanoid figure asking a question.

21. [The electronic device of claim 3] *An electronic device comprising:*

*at least one display;*

*a controller arranged to cause the display to show a rotating menu comprising a plurality of menu options, wherein the menu is displayed with a perspective in which all of the options of the menu that are displayed appear to lie coplanar upon a single apparent plane that intersects the display to form an acute angle between the display and the apparent plane; and,* wherein the menu options are displayed as solid objects and shadows are displayed on an apparent floor beneath and non-contiguous with the objects, whereby a sense of perspective is increased.

[22. The electronic device of claim 3 wherein the perspective is achieved by changing either the shape or the size of at least one of the menu options.]

*23. The electronic device of claim 1 wherein the menu comprises a selection position and one of the menu options is selectable when that option rotates to the selection position.*

* * * * *